United States Patent
Yan et al.

(10) Patent No.: US 8,652,307 B2
(45) Date of Patent: Feb. 18, 2014

(54) APPARATUS AND METHOD FOR MAGNETIC FIELD ASSISTED ELECTROCHEMICAL DISCHARGE MACHINING

(75) Inventors: Biing-Hwa Yan, Kaohsiung (TW);
Chh-Ping Cheng, Miaoli County (TW);
Kun-Ling Wu, Zhonghe (TW);
Yu-Shan Hsu, Banciao (TW)

(73) Assignee: National Central University, Jhongli, Taoyuan County (TW)

( * ) Notice: Subject to any disclaimer, the term of this patent is extended or adjusted under 35 U.S.C. 154(b) by 853 days.

(21) Appl. No.: 12/460,947

(22) Filed: Jul. 27, 2009

(65) Prior Publication Data
US 2010/0243430 A1    Sep. 30, 2010

(30) Foreign Application Priority Data
Mar. 27, 2009  (TW) ............................... 98110260 A

(51) Int. Cl.
*B23H 7/38*    (2006.01)
*B23H 5/02*    (2006.01)

(52) U.S. Cl.
USPC .................... 204/228.8; 204/224 M; 205/641

(58) Field of Classification Search
USPC ........................... 204/224 M, 228.8; 205/641
See application file for complete search history.

(56) References Cited

U.S. PATENT DOCUMENTS

| | | | | |
|---|---|---|---|---|
| 3,697,403 A | * | 10/1972 | Colwell | 204/218 |
| 5,688,392 A | * | 11/1997 | White | 205/654 |
| 6,835,299 B1 | * | 12/2004 | Tchugunov | 205/654 |
| 2002/0170829 A1 | * | 11/2002 | Kim et al. | 205/640 |
| 2007/0228017 A1 | * | 10/2007 | Wei et al. | 219/69.14 |

OTHER PUBLICATIONS

Wuthrich, Physical principles and miniaturization of spark assisted chemical engraving (SACE),J. Micromech. Microeng., 2005, pp. S268-S275, vol. 15, IOP Publishing Ltd, UK.

Wuthrich, Improving the material removal rate in spark-assisted chemical engraving (SACE) gravity-feed . . . , J. Micromech. Microeng, 2006, pp. N28-N31, vol. 16, IOP Pub., UK.

\* cited by examiner

*Primary Examiner* — Nicholas A Smith
(74) *Attorney, Agent, or Firm* — Hudak, Shunk & Farine Co LPA

(57) ABSTRACT

In an apparatus and method for magnetic field assisted electrochemical discharge machining (ECDM), the magneto hydrodynamic (MHD) effect is utilized to improve the thickness of bubble film and the electrolyte circulation so as to enhance the machining accuracy and efficiency. Since charged ions in a magnetic field are induced by Lorenz force to move, and the electrolysis bubbles generated in the ECDM process are suffused with electrification ions on their surfaces, the electrolysis bubbles can be forced to move in the direction of the magnetic field without the need of mechanical disturbance. The present invention can be widely applied in the micro-machining of non-conductive brittle materials of different dimensions and shapes, comprising the forming of microchannels and microholes on a biochip, and in the micro-opto-electro-mechanical system (MOEMS) and various kinds of micro-machining fields. The machined surface is smooth and does not require a second time machining.

20 Claims, 8 Drawing Sheets

APPARATUS AND METHOD FOR MAGNETIC FIELD ASSISTED ELECTROCHEMICAL DISCHARGE MACHINING

FIELD OF THE INVENTION

The present invention relates to an apparatus and method for magnetic field assisted electrochemical discharge machining (ECDM), and more particularly to an apparatus and method that utilize magneto hydrodynamic (MHD) effect to improve the thickness of bubble film and electrolyte circulation, so as to enhance the machining accuracy and the machining rate.

BACKGROUND OF THE INVENTION

Due to their excellent performances in creep resistance, corrosion resistance, heat resistance, etc., various kinds of functional non-conductive brittle materials have been more and more widely applied in different fields and gradually become an important aspect in nowadays high-tech development. However, due to the hard and brittle properties of materials, some factors in connection with the machining apparatus or external environment would cause locally drastically increased material removal amount, which brings largely increased difficulty in machining with high precision, efficiency and reliability, particularly in the fabrication of micro devices that are needed in micro-electromechanical system (MEMS).

To meet the increasing demands for non-conductive micro devices in the current technological development, there is an urgent need for further developing a micro-machining technique that enables high machining precision and efficiency and high surface integrity after machining. When being applied in the process technological field, the conventional machining using mechanical energy is frequently restricted by the tool size and the brittle property of the material being machined, and therefore not easy to meet the required size and precision. On the other hand, there are some other non-conventional machining techniques that utilize heat energy, electric energy and chemical energy to achieve the required precision and machining size that could not be achieved through conventional mechanical machining. These non-conventional machining techniques have already become a main stream for precision machining of non-conductive brittle materials. Some examples of the currently available non-conventional machining techniques that are often used in micro-machining of non-conductive brittle materials comprise ultrasonic machining, laser-beam machining, ion beam machining, etching machining, etc. However, these methods have their inherent problems. For instance, the laser-beam machining is restricted by its high cost and somewhat low machining quality, the ultrasonic machining is restricted by its low machining rate and limited machining shapes, and the chemical etching machining, while having relatively high machining precision, is restricted by its complicated process and can not be used to manufacture high aspect-ratio devices.

Compared to the above-mentioned non-conventional machining techniques, electrochemical discharge machining (ECDM) is one of possible answers that receive wide attention from different industrial fields. Initially, electrochemical machining is widely applied in metal precision machining and forming. However, when proper machining conditions are given for the electrochemical machining to combine with electric discharge, the hybrid machining technique can also be used to machine non-conductive materials effectively. According to the mechanism of ECDM, the workpiece, tool electrode and auxiliary electrode are immersed in an electrolyte solution (typically alkali electrolyte solution) together. The auxiliary electrode has a larger surface than the tool electrode. Both the electrodes are connected with a DC power source. When a negative voltage is applied to the tool electrode and a positive voltage is applied to the auxiliary electrode in the electrolyte. $H_2$ bubbles are generated at the tool electrode and $O_2$ bubbles are generated at the auxiliary electrode. When the applied voltage is higher than a critical voltage, the generation rate of $H_2$ bubbles will be higher than the rate of the bubbles floating to the liquid surface and $H_2$ bubbles are coalesced into a bubble film around tool electrode surface. Due to the bubble film blanketing effect, the current density of the tool electrode exceeds the critical value. Therefore, the discharge happens between the tool electrode and the surrounding electrolyte. As the workpiece is placed near the vicinity of the tool electrode, the high-temperature heat from the discharge sparks melts the material of the workpiece and speeds the chemical etching by the electrolyte to thereby achieve the purpose of removing away some of the material.

Recently, ECDM has been proven to have good potential for use in the non-conductive brittle material micro-machining process. In the implementation of ECDM, it is the machining precision and efficiency thereof that makes ECDM process practical for use. There are many researches on machining characteristics. In an article written by R. Wüthrich et al and published in Journal of Micromechanics and Microengineering, Vol. 15, S268-S275 in 2005, it was mentioned that, among several influential factors in ECDM, comprising the temperature, concentration, and compositions of the electrolyte, the surface area of electrodes being immersed in the electrolyte and the stability of bubble film surrounding the electrode, the stability of bubble film structure is the main and key factor. In the experiments conducted by R. Wüthrich et al, it was found the thickness of the surrounding bubble film forms a restriction to the minimum range of machining. That is, the minimum range can be obtained after the machining is equal to the thickness of the surrounding bubble film. And, R. Wüthrich et al suggested the adding of a surfactant into the electrolyte to reduce the interface energy between the electrodes and the electrolyte, so as to reduce the thickness of the surrounding bubble film and upgrade the machining precision. However, to recycle the waste electrolyte containing the surfactant, complicated procedures are involved. Moreover, in drilling a microhole using ECDM, for example, when a specific working depth has been reached, it becomes more difficult to expel the bubbles from the microhole, and the electrolyte could not be easily supplied to the end surface of the tool electrode. As it is known, the machining speed is mainly affected by the conversion of discharge performance into the circulation of electrolyte in the microhole. In lacking of sufficient electrolyte, electric discharge will not occur at the end surface of the tool electrode, resulting in slowed machining efficiency. R. Wüthrich et al mentioned in their another article published in Journal of Micromechanics and Microengineering, Vol. 16, N28-N31 in 2006 that when an ultrasonic oscillator is mounted to the electrode holder to cooperate with proper tool amplitude and frequency, it would be able to enhance the flowing of the electrolyte and the debris removal effect in the microhole and accordingly, upgrade the machining efficiency. However, it is still a big challenge to modify the electrode holder while maintaining the stability of the spindle mechanism.

SUMMARY OF THE INVENTION

A primary object of the present invention is to provide an apparatus for magnetic field assisted electrochemical discharge machining (ECDM), which comprises a spindle, a tool electrode, an auxiliary electrode, a power supply, an ECDM mechanism, and a magnetic unit. The tool electrode is mounted to an end of the spindle to provide an electrode of a first polar environment. The auxiliary electrode has a polarity opposite to that of the tool electrode to provide an electrode of a second polar environment. The power supply comprises a first electric portion and a second electric portion, which are electrically connected to the tool electrode and the auxiliary electrode, respectively. The ECDM mechanism comprises a containing unit for receiving a workpiece and a conductive machining fluid therein, and the auxiliary electrode is disposed in the containing unit. And, the magnetic unit is used to produce a magnetic field when the tool electrode is fed to machine the workpiece, so that the magnetic force is applied to the conductive machining fluid to produce a magneto hydrodynamic (MHD) effect in the ECDM process, enabling to reduce thickness of the bubble film surrounding the surface of the tool electrode and enhanced circulation of the conductive machining fluid surrounding the electrode, and accordingly improved machining precision and efficiency.

Another object of the present invention is to provide a method for magnetic field assisted electrochemical discharge machining (ECDM), which comprises the following steps: (1) mounting a tool electrode to an end of a spindle; (2) providing a magnetic unit; (3) disposing an auxiliary electrode and a workpiece in a containing unit of an ECDM mechanism; (4) connecting a first electric portion and a second electric portion of a power supply to the tool electrode and the auxiliary electrode, respectively; (5) supplying a conductive machining fluid into the containing unit until a preset level of the machining fluid in the containing unit has been reached; and the preset level must be high enough to fully immerse the workpiece disposed in the containing unit and soak part of the surfaces of the tool electrode and the auxiliary electrode; and (6) turning on a machining power source to feed the tool electrode for machining the workpiece. The magnetic unit can be mounted to the spindle or the ECDM mechanism. When the tool electrode is fed to machine the workpiece, the magnetic unit simultaneously produces a magneto hydrodynamic (MHD) effect in the ECDM process. The present invention utilizes the MHD effect, that is, a phenomenon in which movable charged particles in a magnetic field are induced by Lorenz force to move, in order to upgrade the machining precision and efficiency in ECDM with the aid of magnetism. More specifically, the present invention employs the principle that, since the bubbles generated in the process of electrolysis are suffused with charged ions on their surfaces, it is possible to use the Lorenz force in the presence of a magnetic field to move the charged ions in the magnetic field, so that the electrolysis bubbles are forced to move in the direction of the magnetic field. Therefore, the bubbles are prevented from mutually combining into big bubbles, which will undesirably form a relatively thick layer of the bubble film on the surface of the tool electrode. Meanwhile, the motion of the bubbles brings disturbance of the conductive machining fluid to thereby enhance the circulation of the conductive machining fluid surrounding the tool electrode.

The apparatus and method for magnetic field assisted ECDM according to the present invention provide at least one or more of the following advantages:

(1) The problem of structure stability of the bubble film which surrounds the tool electrode can be improved to help in upgraded machining precision.

(2) The conductive machining fluid or electrolyte can be supplied to machining zones that require relatively deep or micro-machining to thereby help in increased machining efficiency.

(3) The apparatus and method involve only very simple process to enable low manufacturing cost but high machining quality, and can therefore be widely applied in the micro-machining of non-conductive brittle materials of different dimensions and shapes, such as the forming of microchannels and microholes on a biochip, and in the micro-opto-electro-mechanical system (MOEMS) and various kinds of micro-machining fields. The machined surface is smooth without secondary surface impairment and does not require a second time machining.

(4) There is no need to add any other chemical additive to the machining fluid, and the recycling of chemical waste is not a problem in the present invention.

(5) The magnetic unit can be easily mounted and dismounted without the need of modifying the main body of the apparatus, so that the apparatus of the present invention has increased added value and high applicability in industrial fields.

(6) Unlike the chemical etching that requires a mask process, the present invention can be used to directly machine non-conductive brittle materials having a large machining area.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
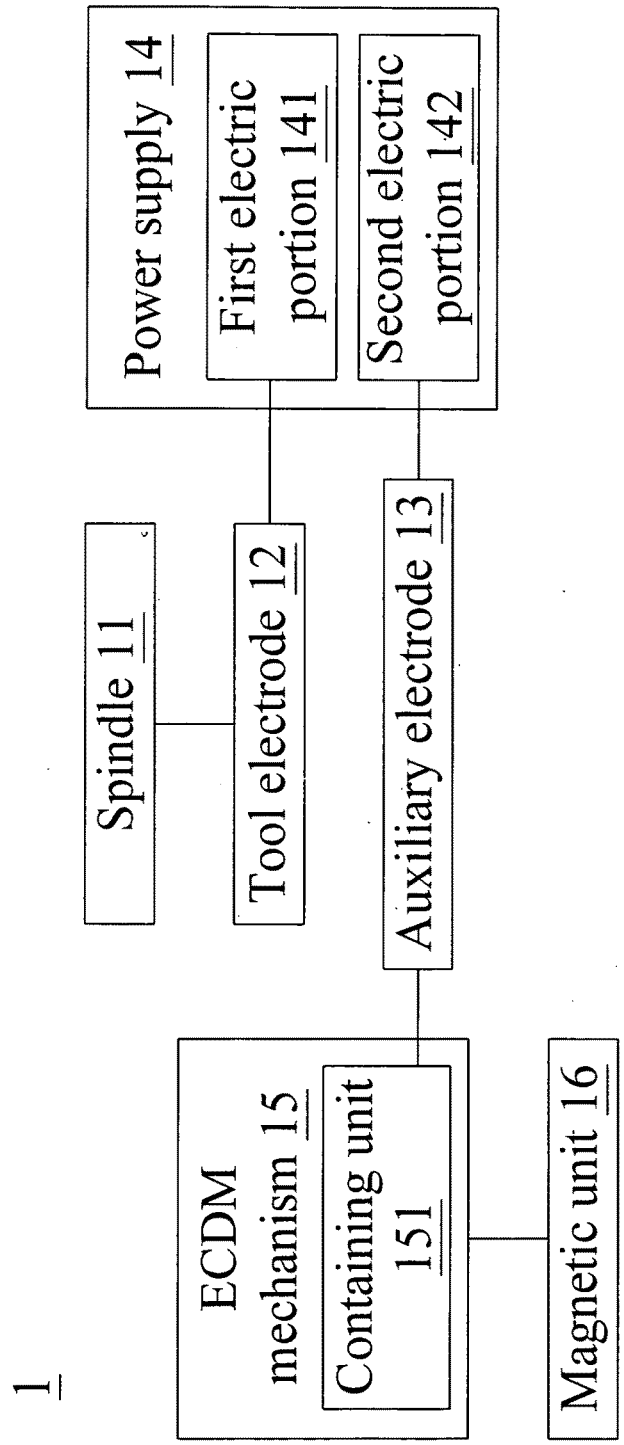
FIG. 1 is a block diagram of an apparatus for magnetic field assisted ECDM according to the present invention.

Please refer to FIG. 1 that is a block diagram of an apparatus for magnetic field assisted electrochemical discharge machining (ECDM) according to the present invention. For the purpose of conciseness, the apparatus of the present invention is also briefly referred to as the magnetic field assisted ECDM apparatus. As shown, the magnetic field assisted ECDM apparatus 1 comprises a spindle 11; a tool electrode 12 mounted to an end of the spindle 11 to serve as a cathode electrode or first polarity; an auxiliary electrode 13 serving as a positive electrode or second polarity; a power supply 14 comprising a first electric portion 141 and a second electric portion 142 for electrically connected to the tool electrode 12 and the auxiliary electrode 13, respectively; an ECDM mechanism 15 comprising a containing unit 151 for receiving a workpiece and a conductive machining fluid; and a magnetic unit 16. The auxiliary electrode 13 is disposed in the containing unit 151. The magnetic unit 16 can be mounted to the ECDM mechanism 15 or to the spindle 11 for producing a magnetic field when the tool electrode 12 is fed to machine the workpieces, so that a magnetic force is applied to the conductive machining fluid to produce a magneto hydrodynamic (MHD) effect in the conductive machining fluid. The tool electrode 12 can be a hollow or a solid electrode having any external configuration, and can be made of a conductive material selected depending on the desired machining characteristics. The auxiliary electrode 13 can be made of a chemically inert conductive material, such as graphite. However, the auxiliary electrode 13 must have a surface area several ten times or even several hundred times larger than that of the tool electrode 12. The magnetic unit 16 can be a permanent magnet or an electromagnet, and the magnetic flux and the magnetic field direction of the magnetic unit 16 can be determined depending on desired machining characteristics. The type, concentration and temperature of the conductive machining fluid can be determined according to different machining requirements so as to achieve the desired usage. The magnetic field assisted ECDM apparatus 1 can be applied in lathe, drilling or milling of non-conductive materials.

Figure 2:
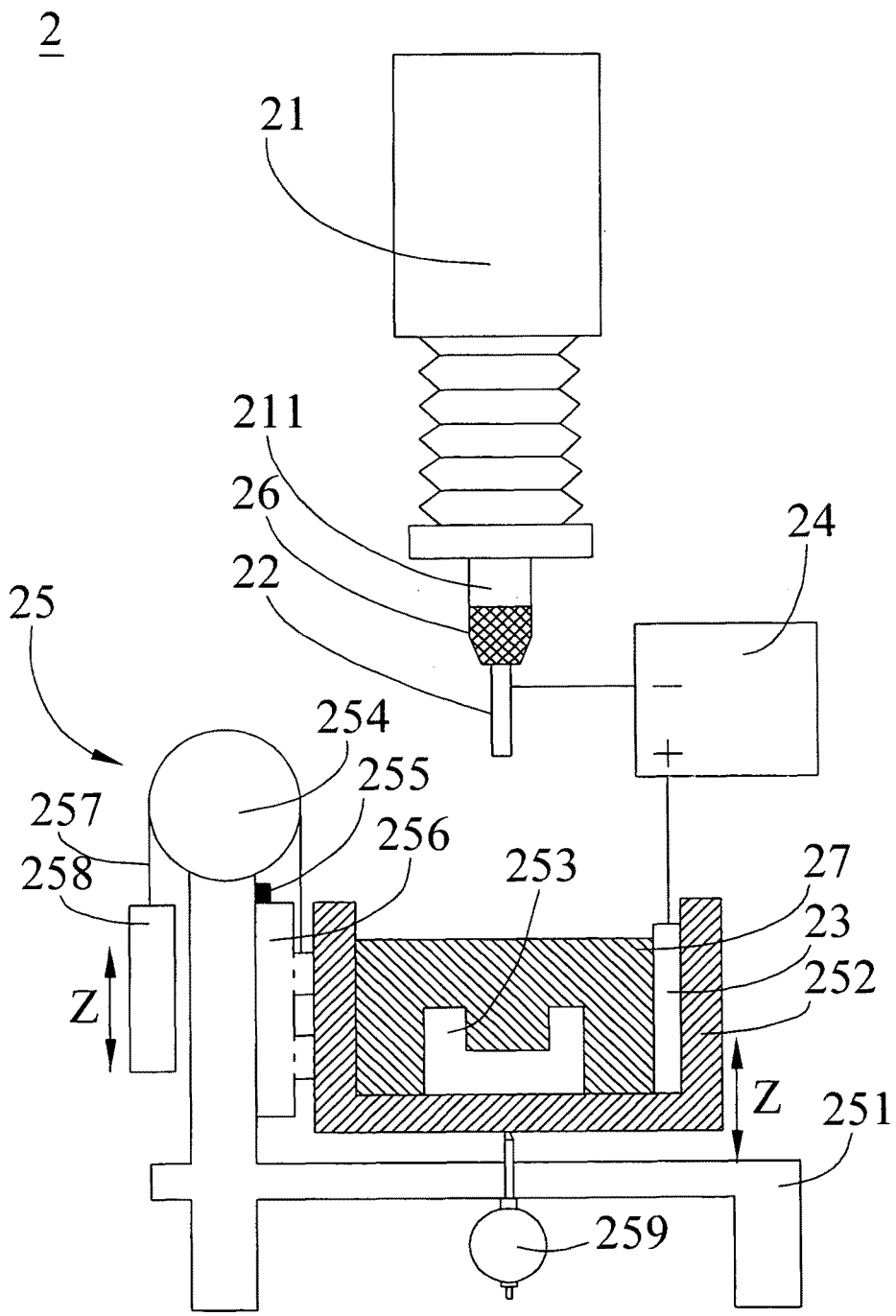
FIG. 2 is a schematic view showing an embodiment of the apparatus for magnetic field assisted ECDM according to the present invention.

FIG. 2 is a schematic view of a magnetic field assisted ECDM apparatus 2 according to an embodiment of the present invention. As shown, the magnetic field assisted ECDM apparatus 2 comprises a spindle 21, a tool electrode 22, an auxiliary electrode 23, a power supply 24, an ECDM mechanism 25, and a magnetic unit 26. The spindle 21 comprises a spin unit 211. The tool electrode 22 is connected to the spin unit 211, and can be made of a suitable conductive material and have a size depending on desired machining characteristics. Moreover, the tool electrode 22 can be machined through various machining processes, such as electrochemical machining, etching, electrical discharge machining, etc. to obtain required accurate shape and size. The magnetic unit 26 is mounted to the spin unit 211 of the spindle 21 to produce the MHD effect during the ECDM process.

The ECDM mechanism 25 comprises a main body 251, a containing unit in the form of a containing tank 252, a workpiece carrier 253, a roll 254, an upper dead center stop screw 255, a linear guide 256, a steel wire 257, a load element 258, and an optical digital instrument 259. The containing tank 252 and the workpiece carrier 253 are made of an acid and alkali resistant non-conductive material to avoid any undesired chemical and electrolytic reactions during the machining to adversely affect the ECDM. Depending on the volume of the containing tank 252, more than one workpiece to be machined can be arranged on the workpiece carrier 253. The containing tank 252 is assembled to the main body 251 via the linear guide 256. The steel wire 257 is wound through the roll 254 to connect the linear guide 256 to the load element 258, so that the workpiece can be fed in the Z-direction through the gravity action during the machining. The upper dead center stop screw 255 is used to define an upper dead center position for the containing tank 252. The optical digital instrument 259 is connected to a bottom of the containing tank 252 for determining from changes in data whether the workpiece has been machined to a preset target depth.

The power supply 24 has a negative voltage connected to the tool electrode 22 and an positive voltage connected to the auxiliary electrode 23 disposed in the containing tank 252. A conductive machining fluid 27 is supplied in the containing tank 252. When an electric current is supplied from the power supply 24, the tool electrode 22, the auxiliary electrode 23 and the conductive machining fluid 27 together form a complete electrolytic circuit. In addition, the auxiliary electrode 23 can be made of any chemically inert conductive material to avoid any change in the compositions and properties of the conductive machining fluid 27 due to electrolytic dissociation of the auxiliary electrode material. The type, concentration and temperature of the conductive machining fluid 27 can be determined depending on different machining requirements in order to meet the desired usage.

Figure 3:
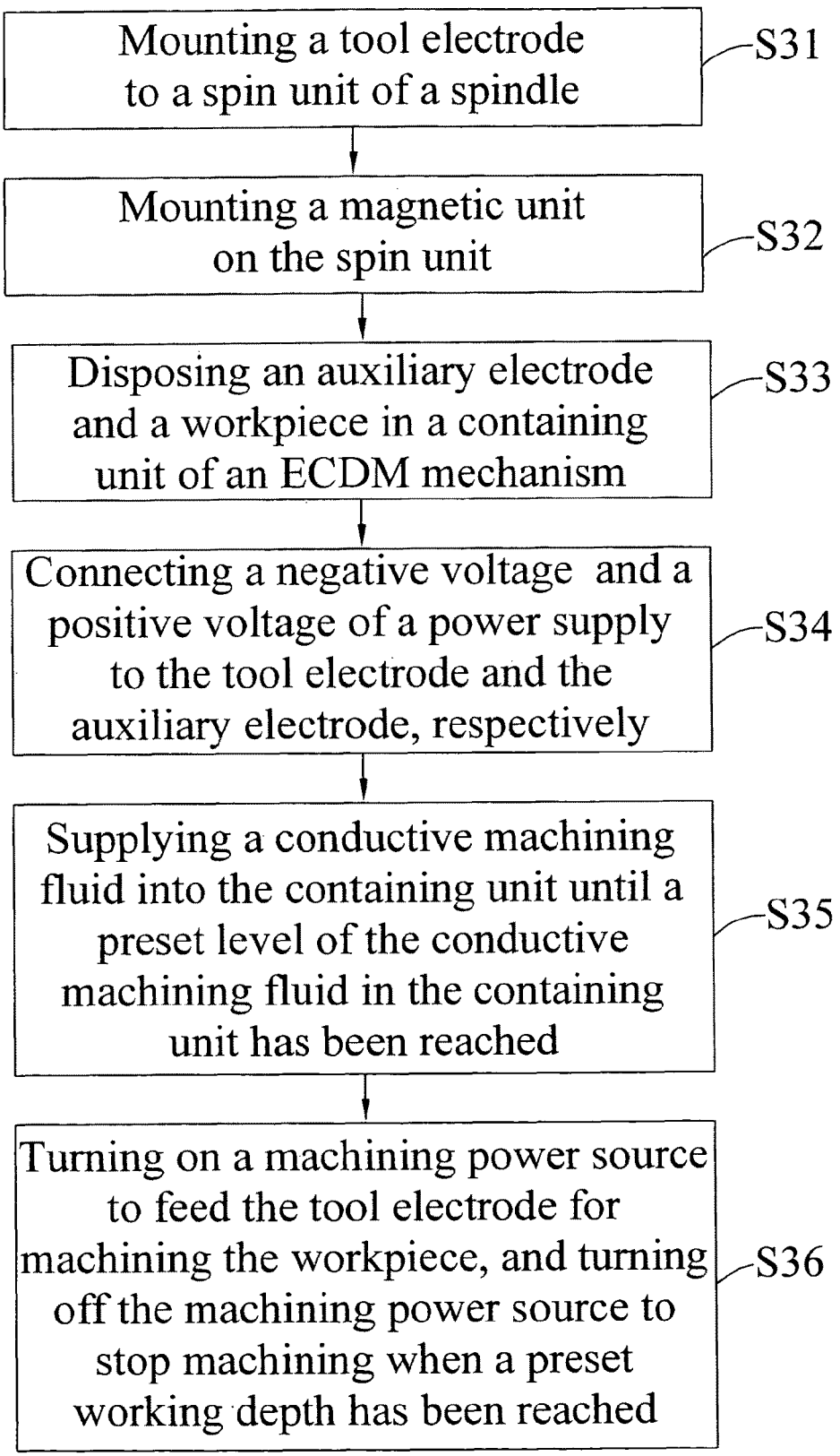
FIG. 3 is a flowchart showing the steps comprised in a method for magnetic field assisted ECDM according to the present invention.

The present invention also provides a method for magnetic field assisted ECDM. FIG. 3 is a flowchart showing the steps comprised in the method of the present invention. In a first step S31, a tool electrode is mounted to a spin unit of a spindle. In a second step S32, a magnetic unit is also mounted to the spin unit. In a third step S33, an auxiliary electrode and a workpiece are disposed in a containing unit of an ECDM mechanism. In a fourth step S34, a negative voltage and a positive voltage of a power supply are connected to the tool electrode and the auxiliary electrode, respectively. In a fifth step S35, a conductive machining fluid is supplied into the containing unit until a preset level of the machining fluid in the containing unit has been reached. The preset level must be high enough to fully immerse the workpiece disposed in the containing unit and soak a part of the surfaces of the tool electrode and the auxiliary electrode. And, in a sixth step S36, a machining power supply is turned on to feed the tool electrode for machining the workpiece, and the machining power supply is turned off to stop machining when a preset working depth on the workpiece has been reached. When the tool electrode is fed to machine the workpiece, the magnetic unit simultaneously produces an MHD effect in the ECDM process. That is, due to the influence of the magnetic field produced by the magnetic unit, charged ions are induced by Lorenz force to move, bringing the surface-charged electrolysis bubbles to move in the direction of the magnetic field, so that the thickness of the bubble film surrounding the surface of the tool electrode is reduced, and the flow of the conductive machining fluid surrounding the tool electrode is enhanced. The magnetic unit can be a permanent magnet or an electromagnet, and the magnetic flux and the magnetic field direction of the magnetic unit can be determined depending on desired machining characteristics. The auxiliary electrode can be made of a chemically inert conductive material, such as graphite. The type, concentration and temperature of the conductive machining fluid can be determined according to different machining requirements. The magnetic field assisted ECDM method can be applied in lathe, drilling or milling non-conductive materials.

Figure 4:
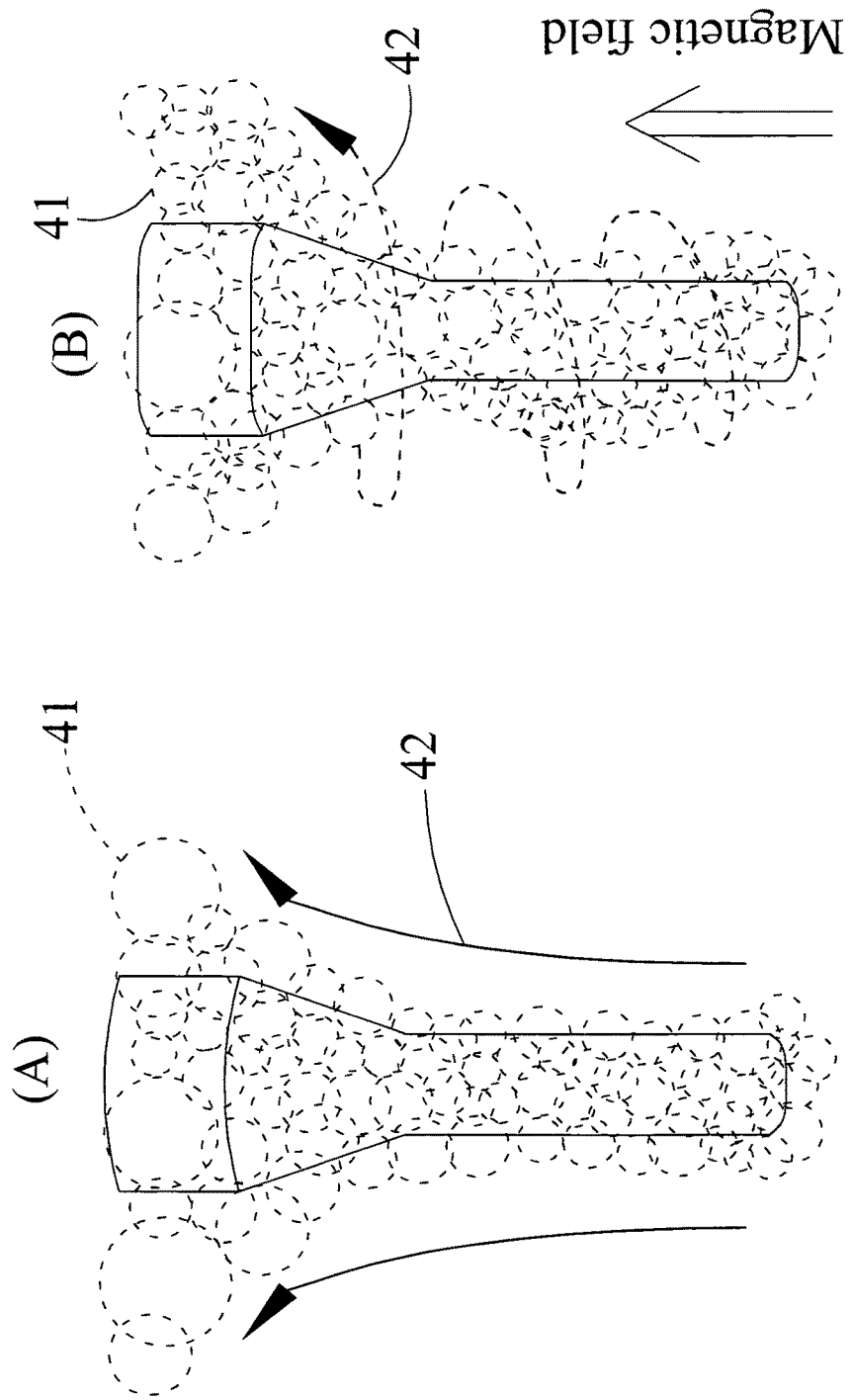
FIG. 4 shows the motion of electrolysis bubbles generated in ECDM with and without the aid of a magnetic field according to the present invention.

Part (A) and part (B) of FIG. 4 respectively show the surrounding state and the motion state of electrolysis bubbles generated around the tool electrode in ECDM without and with the aid of a magnetic field. As shown, under the aid of a magnetic field, the motion state 42 of the electrolysis bubbles 41 generated in the ECDM changes from a disorderly drifting state as shown in part (A) into a concentric motion around the tool electrode as shown in part (B). Meanwhile, the motion of the bubbles also brings enhanced disturbance and circulation in the conductive machining fluid surrounding the tool electrode.

Figure 5:
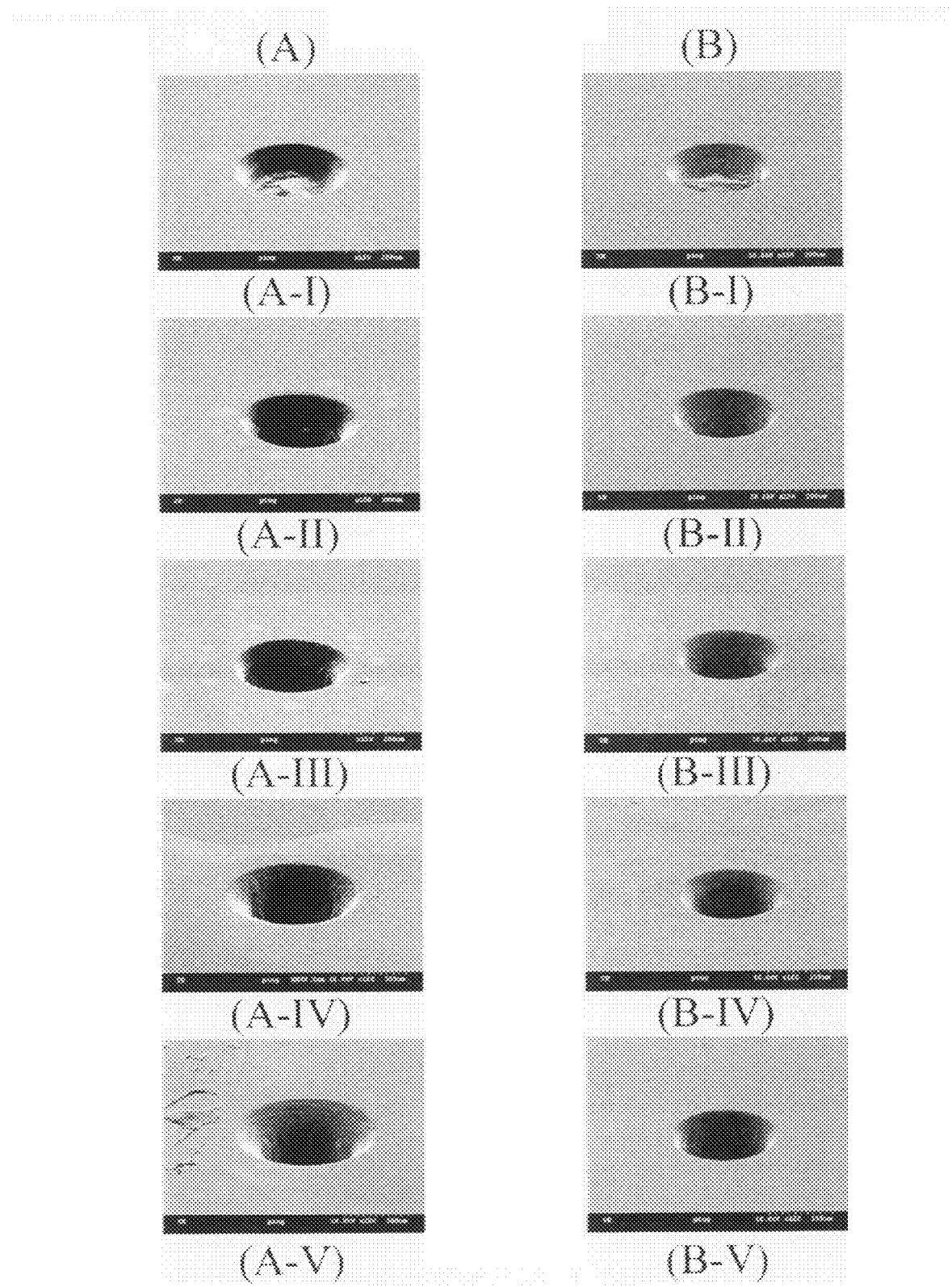
FIG. 5 shows SEM images of microholes of different depths drilled through ECDM with and without the aid of a magnetic field according to the present invention.
Figure 6:
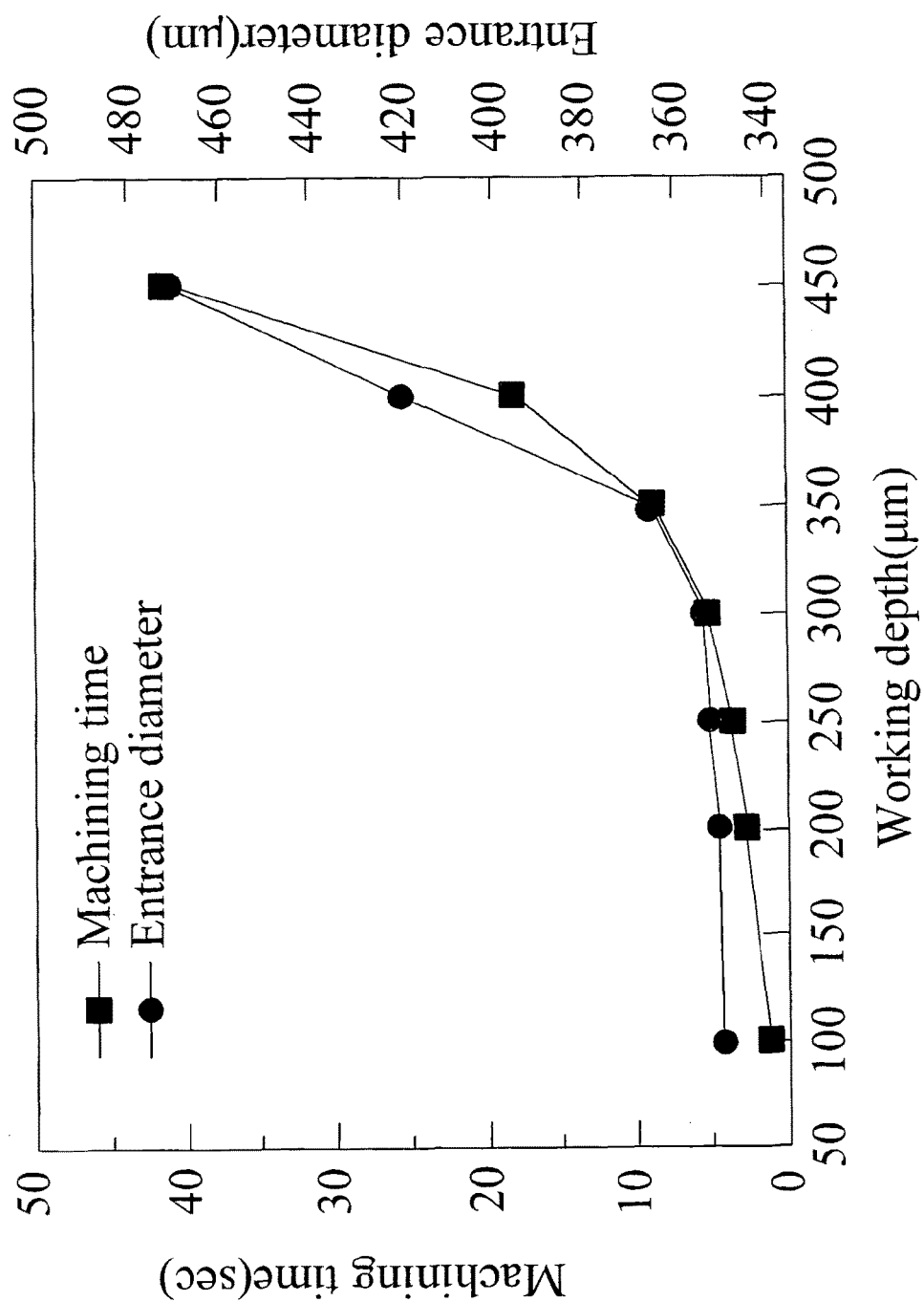
FIG. 6 shows the curves of machining time and entrance diameter for microholes of different depths drilled through ECDM without the aid of a magnetic field according to the present invention.

Please refer to the part (A) of FIG. 5 that shows scanning electronic microscope (SEM) images of microholes of different depths drilled on borosilicate glass through ECDM without the aid of a magnetic field, and to FIG. 6 that shows the curves of machining time and entrance diameter of the microholes in part (A) of FIG. 5. The microholes illustrated in pictures 5A-I to 5A-V respectively have a working depth of 100 μm, 250 μm, 300 μm, 400 μm, and 450 μm. As shown, when a specific working depth is reached, it becomes more difficult to expel the bubbles from the microhole. To reduce the interface energy among them, the bubbles will mutually combine and pile, which will prevent the conductive machining fluid from entering into the microhole, resulting in reduced discharge sparks occurring at the end surface of the tool electrode. Therefore, the electric discharge is concentrated in the entrance of the microhole to result in quickly increased entrance diameter and machining time.

Figure 7:
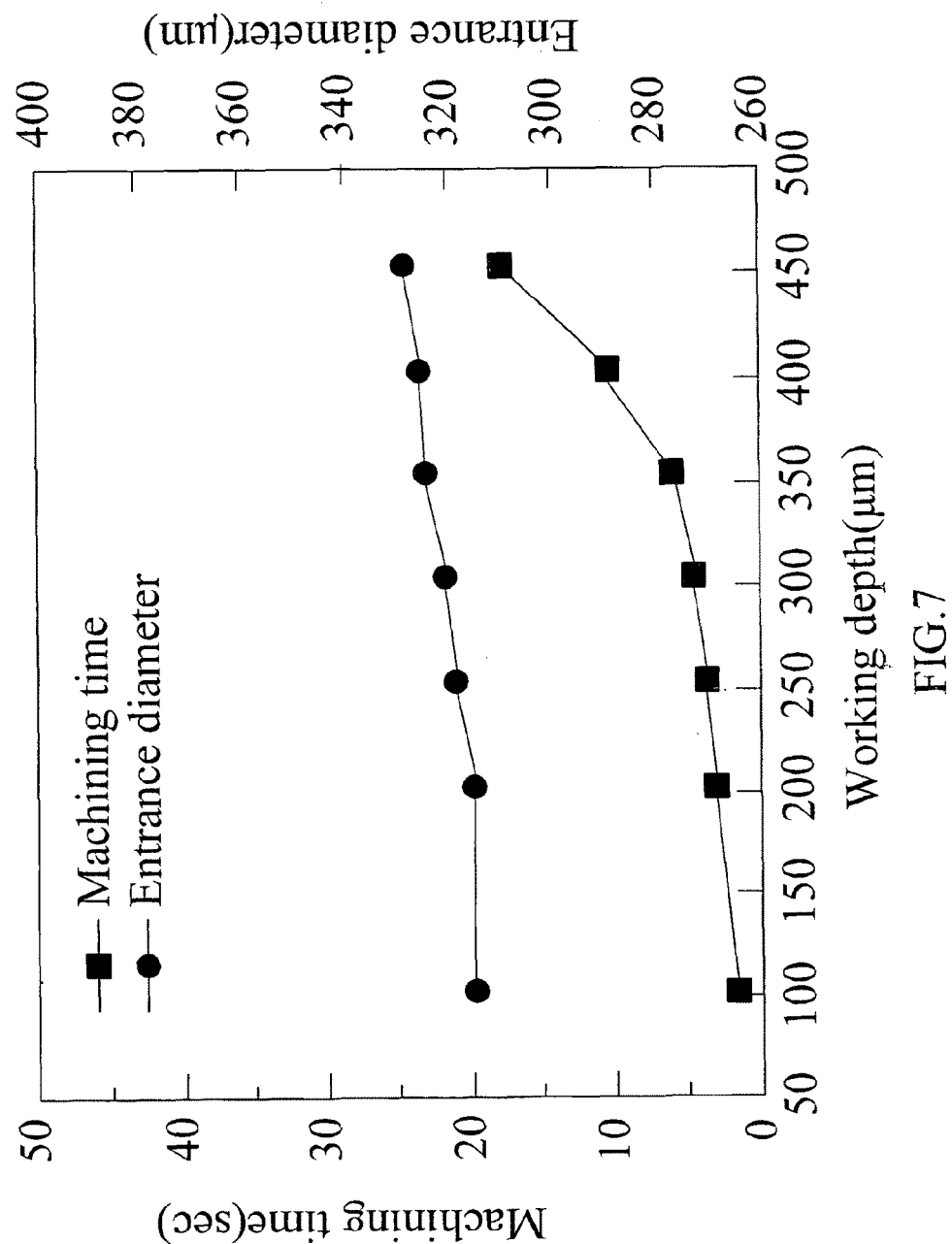
FIG. 7 shows the curves of machining time and entrance diameter for microholes of different depths drilled through ECDM with the aid of a magnetic field according to the present invention.

Please refer to the part (B) of FIG. 5 that shows SEM images of microholes of different depths drilled on borosilicate glass through ECDM with the aid of a magnetic field, and to FIG. 7 that shows the curves of machining time and entrance diameter of the microholes in part (B) of FIG. 5. The microholes illustrated in pictures 5B-I to 5B-V respectively have a working depth of 100 μm, 250 μm, 300 μm, 400 μm, and 450 μm. As shown, since the motion of the electrolysis bubbles under the MHD effect enhances the disturbance of electrolyte surrounding the tool electrode and reduces the coalescing of bubbles at the entrance of the microhole, the entrance diameter of the microhole is not quickly increased, and the machining rate is relatively uniform.

Figure 8:
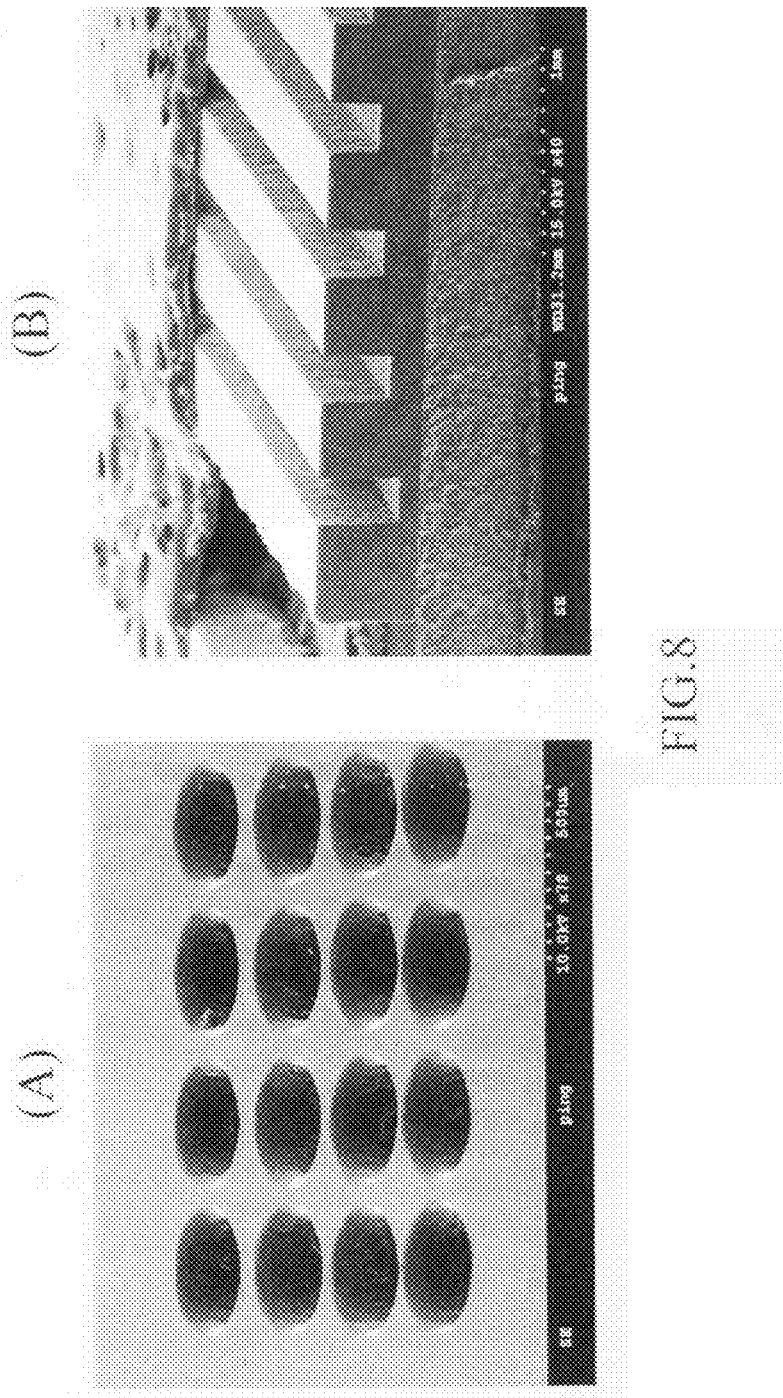
FIG. 8 shows SEM images of microholes and micro grooves formed through the magnetic field assisted ECDM method according to the present invention.

Part (A) and part (B) of FIG. 8 show SEM images of microholes and micro grooves, respectively, formed through the magnetic field assisted ECDM method according to the present invention. As can be seen from the SEM images, the apparatus and the method of the present invention provide obviously upgraded machining precision and efficiency, and no residual stress and secondary surface impairment are found on the machined surface. Therefore, the present invention is helpful in machining non-conductive brittle materials.

The present invention has been described with a preferred embodiment thereof and it is understood that many changes and modifications in the described embodiment can be carried out without departing from the scope and the spirit of the invention that is intended to be limited only by the appended claims.

What is claimed is:

1. An apparatus for magnetic field assisted electrochemical discharge machining (ECDM), comprising:
   a spindle;
   a tool electrode mounted to an end of the spindle to provide an electrode of a first polar environment;
   an auxiliary electrode having a polarity opposite to that of the tool electrode to provide an electrode of a second polar environment;
   a power supply comprising a first electric portion and a second electric portion, the first and second electric portions are electrically connected to the tool electrode and the auxiliary electrode, respectively;
   an electrochemical discharge machining (ECDM) mechanism comprising a containing unit for receiving a workpiece and a conductive machining fluid therein, and the auxiliary electrode being disposed in the containing unit, and an optical digital instrument being connected to a bottom of the containing unit for real-time monitoring and immediately determining whether the workpiece has been machined to a preset target depth; and
   a magnetic unit being used to produce a magnetic field when the tool electrode is fed to machine the workpiece, so that a magnetic force is applied to the conductive machining fluid to produce a magneto hydrodynamic (MID) effect in the conductive machining fluid;
   wherein a plurality of electrolysis bubbles having a substantial amount of charged ions thereon are generated during electrolysis process, when the tool electrode is fed to machine the workpiece, due to the influence of the magnetic field produced by the magnetic unit and the electric field produced during the electrolysis process, the charged ions of the electrolysis bubbles are affected by Lorenz force resulting in a convection of the electrolysis bubbles producing the MHD effect in the conductive machining fluid, and then a thickness of a film of the electrolysis bubbles surrounding the surface of the tool electrode is reduced, and a circulation of the conductive machining fluid surrounding the tool electrode is enhanced.

2. The apparatus for magnetic field assisted ECDM as claimed in claim 1, wherein the spindle comprises a spin unit.

3. The apparatus for magnetic field assisted ECDM as claimed in claim 2, wherein the magnetic unit is mounted to the spin unit.

4. The apparatus for magnetic field assisted ECDM as claimed in claim 1, wherein the magnetic unit is mounted to the spindle or the ECDM mechanism.

5. The apparatus for magnetic field assisted ECDM as claimed in claim 1, wherein the auxiliary electrode is made of a chemically inert conductive material.

6. The apparatus for magnetic field assisted ECDM as claimed in claim 5, wherein the auxiliary electrode material comprises graphite.

7. The apparatus for magnetic field assisted ECDM as claimed in claim 1, wherein the magnetic unit is a permanent magnet or an electromagnet.

8. The apparatus for magnetic field assisted ECDM as claimed in claim 7, wherein magnetic flux and magnetic field direction of the magnetic unit are determined depending on desired machining characteristics.

9. The apparatus for magnetic field assisted ECDM as claimed in claim 1, wherein the apparatus is applicable to drilling, lathe and milling of non-conductive materials.

10. A method for magnetic field assisted electrochemical discharge machining (ECDM), comprising the following steps:
    mounting a tool electrode to an end of a spindle;
    providing a magnetic unit;
    disposing an auxiliary electrode and a workpiece in a containing unit of an ECDM mechanism;
    connecting a first electric portion and a second electric portion of a power supply to the tool electrode and the auxiliary electrode, respectively;
    supplying a conductive machining fluid into the containing unit until a preset level of the conductive machining fluid in the containing unit has been reached; and
    turning on a machining power source to feed the tool electrode for machining the workpiece;
    wherein an optical digital instrument is connected to a bottom of the containing unit for real-time monitoring and immediately determining whether the workpiece has been machined to a preset target depth;

wherein when the tool electrode is fed to machine the workpiece, the magnetic unit simultaneously produces a magneto hydrodynamic (MHD) effect in the conductive machining fluid;

wherein a plurality of electrolysis bubbles having a substantial amount of charged ions thereon are generated during electrolysis process, when the tool electrode is fed to machine the workpiece, due to the influence of the magnetic field produced by the magnetic unit and the electric field produced during the electrolysis process, the charged ions of the electrolysis bubbles are affected by Lorenz force resulting in a convection of the electrolysis bubbles producing the MHD effect in the conductive machining fluid, and then a thickness of a film of the electrolysis bubbles surrounding the surface of the tool electrode is reduced, and a circulation of the conductive machining fluid surrounding the tool electrode is enhanced.

11. The method for magnetic field assisted ECDM as claimed in claim 10, wherein the spindle comprises a spin unit.

12. The method for magnetic field assisted ECDM as claimed in claim 11, wherein the magnetic unit is mounted on the spin unit.

13. The method for magnetic field assisted ECDM as claimed in claim 10, wherein the magnetic unit is mounted to the spindle or the ECDM mechanism.

14. The method for magnetic field assisted ECDM as claimed in claim 10, wherein the preset level is high enough to fully immerse the workpiece disposed in the containing unit and soak part of outer surfaces of the tool electrode and the auxiliary electrode.

15. The method for magnetic field assisted ECDM as claimed in claim 10, wherein a type, concentration and temperature of the conductive machining fluid are determined according to different machining requirements.

16. The method for magnetic field assisted ECDM as claimed in claim 10, wherein the magnetic unit is a permanent magnet or an electromagnet.

17. The method for magnetic field assisted ECDM as claimed in claim 16, wherein magnetic flux and magnetic field direction of the magnetic unit are determined depending on desired machining characteristics.

18. The method for magnetic field assisted ECDM as claimed in claim 10, wherein the auxiliary electrode is made of a chemically inert conductive material.

19. The method for magnetic field assisted ECDM as claimed in claim 18, wherein the auxiliary electrode material comprises graphite.

20. The method for magnetic field assisted ECDM as claimed in claim 10, wherein the method is applicable to drilling, lathe and milling of non-conductive materials.

* * * * *

UNITED STATES PATENT AND TRADEMARK OFFICE
CERTIFICATE OF CORRECTION

| | | |
|---|---|---|
| PATENT NO. | : 8,652,307 B2 | Page 1 of 1 |
| APPLICATION NO. | : 12/460947 | |
| DATED | : February 18, 2014 | |
| INVENTOR(S) | : Biing-Hwa Yan et al. | |

It is certified that error appears in the above-identified patent and that said Letters Patent is hereby corrected as shown below:

In the Claims

In column 8, line 7, claim 1, replace "MID" with --MHD--

Signed and Sealed this
Twenty-seventh Day of May, 2014

Michelle K. Lee
*Deputy Director of the United States Patent and Trademark Office*